United States Patent Office.

RUDOLPH D'HEUREUSE, OF SAN FRANCISCO, CALIFORNIA.

*Letters Patent No.* 67,512, *dated August* 6, 1867; *reissue No.* 3,045, *dated July* 21, 1868.

IMPROVEMENT IN FERMENTING AND OXIDIZING MASH, MALT, &c.

The Schedule referred to in these Letters Patent and making part of the same.

TO ALL WHOM IT MAY CONCERN:

Be it known that I, RUDOLPH D'HEUREUSE, of San Francisco, in the county of San Francisco, and State of California, have invented a new and useful Improvement in the Mode of Fermenting Mash for distillation, and vinous or other substances subject to fermentation or germination; and I do hereby declare that the following is a full, clear, and exact description thereof, which will enable others skilled in the art to make and use the same.

This invention consists in an improved mode of facilitating fermentation or germination by the introduction of air of proper temperature and moisture, into the substances to be acted on, at the bottom, the same being contained in tubs or vats suitably arranged for the purpose, whereby the oxygen of the air, necessary for any fermentation, is brought more thoroughly into contact with the mass, and facilitates the process, while the temperature and quantity of the introduced air tend to control the progress of the fermentation in part, independently of the climate or season of the year.

The introduced air rising upwards through a fluid substance, quietly agitates the same, thereby exposing every part of it to the oxidizing action of the air more perfectly and uniformly than in a quiescent state.

When yeast is used, which is more or less uniformly distributed, the mixing will take place more thoroughly by the introduction of air, therefore the formation of alcohol will be appreciably increased, and otherwise the product materially improved.

To enable others skilled in the art to understand and use my invention, I will proceed to describe the same.

Air of proper temperature and moisture is introduced into the substance to be fermented or germinated, at or near the bottom of the vessel containing the same, to be operated upon in such a manner that the air enters the substance, for instance, by way of perforated pipes or plates, as much divided as possible, to penetrate every part of the substance, the air to be impelled by pumps, bellows, or other contrivances, and conveyed by pipes, hose, or other arrangement, to the perforated termination by which it enters the substance.

Having thus described my invention, I claim as new, and desire to secure by Letters Patent—

The improved mode of facilitating fermentation or germination by the introduction of air or other gaseous substance of proper temperature and moisture, with mash for distillation, vinous or other substances subject to fermentation or germination, at or near the bottom of the same, substantially as and for the purpose described.

The above specification of my invention signed by me, this 23d day of May, 1868.

R. D'HEUREUSE.

Witnesses:

E. V. SUTTER,

E. L. OHM.